US012661875B2

(12) United States Patent
Ponti et al.

(10) Patent No.: US 12,661,875 B2
(45) Date of Patent: Jun. 23, 2026

(54) BIODEGRADABLE FILM

(71) Applicant: NOVAMONT S.P.A., Novara (IT)

(72) Inventors: Roberto Ponti, Marano Ticino (IT); Claudio Russo, Novara (IT)

(73) Assignee: NOVAMONT S.P.A., Novara (IT)

( * ) Notice: Subject to any disclaimer, the term of this patent is extended or adjusted under 35 U.S.C. 154(b) by 0 days.

(21) Appl. No.: 17/665,039

(22) Filed: Feb. 4, 2022

(65) Prior Publication Data

US 2022/0402249 A1 Dec. 22, 2022

Related U.S. Application Data

(63) Continuation of application No. 16/309,576, filed as application No. PCT/EP2017/064408 on Jun. 13, 2017, now abandoned.

(30) Foreign Application Priority Data

Jun. 13, 2016 (IT) ........................ 102016000060486

(51) Int. Cl.

| | |
|---|---|
| *B32B 27/08* | (2006.01) |
| *A01G 13/02* | (2006.01) |
| *A01G 13/33* | (2025.01) |
| *B32B 7/04* | (2019.01) |
| *B32B 27/18* | (2006.01) |
| *B32B 27/20* | (2006.01) |
| *B32B 27/22* | (2006.01) |
| *B32B 27/28* | (2006.01) |
| *B32B 27/30* | (2006.01) |
| *B32B 27/32* | (2006.01) |
| *B32B 27/34* | (2006.01) |
| *B32B 27/36* | (2006.01) |
| *B32B 27/40* | (2006.01) |
| *B32B 27/42* | (2006.01) |
| *C08J 5/18* | (2006.01) |
| *C08L 67/02* | (2006.01) |

(52) U.S. Cl.

CPC .............. *B32B 27/08* (2013.01); *A01G 13/33* (2025.01); *B32B 7/04* (2013.01); *B32B 27/18* (2013.01); *B32B 27/20* (2013.01); *B32B 27/22* (2013.01); *B32B 27/285* (2013.01); *B32B 27/302* (2013.01); *B32B 27/304* (2013.01); *B32B 27/306* (2013.01); *B32B 27/308* (2013.01); *B32B 27/32* (2013.01); *B32B 27/34* (2013.01); *B32B 27/36* (2013.01); *B32B 27/365* (2013.01); *B32B 27/40* (2013.01); *B32B 27/42* (2013.01); *C08J 5/18* (2013.01); *C08L 67/02* (2013.01); *B32B 2250/24* (2013.01); *B32B 2264/10* (2013.01); *B32B 2264/102* (2013.01); *B32B 2264/104* (2013.01); *B32B 2270/00* (2013.01); *B32B 2307/21* (2013.01); *B32B 2307/3065* (2013.01); *B32B 2307/50* (2013.01); *B32B 2307/5825* (2013.01); *B32B 2307/7163* (2013.01); *B32B 2307/732* (2013.01); *B32B 2439/70* (2013.01); *B32B 2553/00* (2013.01); *C08J 2367/02* (2013.01); *C08J 2403/02* (2013.01); *C08J 2425/14* (2013.01); *C08J 2467/02* (2013.01); *C08J 2467/04* (2013.01); *C08L 2201/06* (2013.01); *C08L 2203/16* (2013.01); *C08L 2205/025* (2013.01); *C08L 2205/03* (2013.01); *C08L 2205/035* (2013.01); *C08L 2310/00* (2013.01); *Y10T 428/1334* (2015.01); *Y10T 428/1352* (2015.01)

(58) Field of Classification Search
None
See application file for complete search history.

(56) References Cited

U.S. PATENT DOCUMENTS

| | | | |
|---|---|---|---|
| 5,446,079 | A | 8/1995 | Buchanan et al. |
| 8,188,185 | B2 | 5/2012 | Wang et al. |
| 10,774,197 | B2 | 9/2020 | Bastioli et al. |
| 2009/0324917 | A1 | 12/2009 | Wang et al. |
| 2012/0107527 | A1 | 5/2012 | Auffermann |
| 2012/0178896 | A1 | 7/2012 | Bastioli et al. |
| 2012/0316257 | A1 | 12/2012 | Bastioli |

FOREIGN PATENT DOCUMENTS

| | | | |
|---|---|---|---|
| WO | WO 2012/017095 | A1 * | 2/2012 |
| WO | WO-2014/057001 | | 4/2014 |

OTHER PUBLICATIONS

Park et al., "Modification of Physical Properties of PBAT by Using TPS", International Proceedings of Chemical, Biological and Environmental Engineering, Jan. 2012, pp. 67-71. XP055406198.
English Abstract of JP 2009227882 A, Japan, Oct. 2009, 5 pages.

* cited by examiner

*Primary Examiner* — Tae H Yoon
(74) *Attorney, Agent, or Firm* — POLSINELLI PC

(57) ABSTRACT

This invention relates to a biodegradable film which is particularly suitable for the manufacture of packaging and is also characterised by high level mechanical properties.

18 Claims, No Drawings

BIODEGRADABLE FILM

CROSS REFERENCE TO RELATED APPLICATIONS

This application is a Continuation of co-pending application Ser. No. 16/309,576, now abandoned and filed Dec. 13, 2018, which in turn is the National Phase of Application No. PCT/EP2017/064408 filed Jun. 13, 2017, which claims priority to Application No. 102016000060486 filed in Italy on Jun. 13, 2016 under 35 U.S.C. § 119. The entire contents of each application are hereby incorporated by reference.

DESCRIPTION

This invention relates to a biodegradable film that is particularly suitable for use in the manufacture of packaging of various kinds, in particular bags for the carrying of goods and bags for food packaging, characterized by high level mechanical properties, in particular high tear resistance. The production of packaging, in particular bags for the carrying of goods, requires the use of films with good mechanical properties.

In the biodegradable packaging sector, in addition to mechanical properties, there is also a need to make use of materials that are able to degrade once they have reached the end of their primary use without giving rise to an accumulation of wastes in the environment. The development of biodegradable films combining these different properties is in fact a challenge requiring that different needs, which are often very inconsistent with each other, be balanced.

This invention addresses this problem and presents a solution to it that is capable of suitably balancing these different requirements. In particular this invention relates to a film made by a composition comprising i) 30-95% by weight, preferably 50-85% by weight, with respect to the sum of components i.-v., of at least one polyester comprising:
  a) a dicarboxylic component comprising, with respect to the total dicarboxylic component:
    a1) 35-70% by moles, preferably 40-60% by moles, more preferably 45-60% by moles, of units deriving from at least one aromatic dicarboxylic acid;
    a2) 65-30% by moles, preferably 60-40% by moles, more preferably 55-40% by moles, of units deriving from at least one saturated aliphatic dicarboxylic acid;
    a3) 0-5% by moles of units deriving from at least one unsaturated aliphatic dicarboxylic acid;
  b) a diol component comprising, with respect to the total diol component:
    b1) 95-100% by moles of units deriving from at least one saturated aliphatic diol;
    b2) 0-5% by moles of units deriving from at least one unsaturated aliphatic diol;
ii) 0.1-50% by weight, preferably 5-40% by weight, with respect to the sum of components i.-v., of at least one polymer of natural origin;
iii) 1-40% by weight, preferably 2-30% by weight, with respect to the sum of components i.-v., of at least one polyhydroxyalkanoate;
iv) 0-15% by weight, with respect to the sum of components i.-v., of at least one inorganic filler;
v) 0-5% by weight, preferably 0-0.5%, with respect to the sum of components i.-v., of at least one cross-linking agent and/or chain extender comprising at least one compound having two and/or more functional groups including isocyanate, peroxide, carbodiimide, isocyanurate, oxazoline, epoxide, anhydride or divinylether groups and mixtures thereof.

Surprisingly, it has been discovered that a film having this combination of components has extraordinarily good mechanical and biodegradability properties, rendering it suitable for the production of packaging of various kinds.

In particular, the film according to this invention structurally comprises a continuous phase and a dispersed phase capable of rendering the film rapidly biodegradable under industrial composting conditions and more preferably in home composting according to standard UNI11355. The said film also has high level mechanical properties, in particular a tear resistance in the machine direction of >100 N/mm, determined according to ASTM D1922 (at 23° C. and 55% relative humidity).

Concerning polyester i., the aromatic dicarboxylic acids in component a1 are preferably selected from aromatic dicarboxylic acids of the phthalic acid type, preferably terephthalic acid or isophthalic acid, more preferably terephthalic acid, and heterocyclic dicarboxylic aromatic compounds, preferably 2,5-furandicarboxylic acid, 2,4-furandicarboxylic acid, 2,3-furandicarboxylic acid, 3,4-furandicarboxylic acid, more preferably 2,5-furandicarboxylic acid, their esters, salts and mixtures. In a preferred embodiment the said aromatic dicarboxylic acids comprise:
  from 1 to 99% by moles, preferably from 5 to 95% and more preferably from 10 to 80%, of terephthalic acid, its esters or salts;
  from 99 to 1% by moles, preferably from 95 to 5% and more preferably from 90 to 20%, of 2,5-furandicarboxylic acid, its esters or salts.

The saturated aliphatic dicarboxylic acids in component a2 of polyester i. are preferably selected from saturated $C_2$-$C_{24}$, preferably $C_4$-$C_{13}$, more preferably $C_4$-$C_{11}$ dicarboxylic acids, their $C_1$-$C_{24}$, preferably $C_1$-$C_4$, alkyl esters, their salts and mixtures thereof. Preferably the saturated aliphatic dicarboxylic acids are selected from succinic acid, 2-ethylsuccinic acid, glutaric acid, 2-methylglutaric acid, adipic acid, pimelic acid, suberic acid, azelaic acid, sebacic acid, undecanedioic acid, dodecanedioic acid, brassylic acid, hexadecanedioic acid, octadecanedioic acid and their $C_{1-24}$ alkyl esters. In a preferred embodiment of this invention the saturated aliphatic dicarboxylic acid comprise mixtures comprising at least 50% by moles, preferably more than 60% by moles, more preferably more than 65% by moles, of succinic acid, adipic acid, azelaic acid, sebacic acid, brassylic acid, their $C_1$-$C_{24}$, preferably $C_1$-$C_4$, esters, and mixtures thereof. In a particularly preferred embodiment the said mixtures comprise or consist of adipic acid and azelaic acid and contain azelaic acid in a quantity of between 5 and 40% by moles, more preferably between 10 and 35% by moles of azelaic acid with respect to the sum of adipic acid and azelaic acid.

The unsaturated aliphatic dicarboxylic acids in component a3 of polyester i. are preferably selected from itaconic acid, fumaric acid, 4-methylene-pimelic acid, 3,4-bis(methylene)nonandioic acid, 5-methylene-nonandioic acid, their $C_1$-$C_{24}$, preferably $C_1$-$C_4$, alkyl esters, their salts and mixtures thereof. In a preferred embodiment of this invention the unsaturated aliphatic dicarboxylic acids comprise mixtures comprising at least 50% by moles, preferably more than 60% by moles, more preferably more than 65% by moles, of itaconic acid and its $C_1$-$C_{24}$, preferably $C_1$-$C_4$, esters. More preferably the unsaturated aliphatic dicarboxylic acid comprise itaconic acid.

As far as the saturated aliphatic diols in component b1 of polyester i. are concerned, these are preferably selected from 1,2-ethanediol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,4-cyclohaxanedimethanol, neopentylglycol, 2-methyl-1,3-propanediol, dianhydrosorbitol, dianhydromannitol, dianhydroiditol, cyclohexanediol, cyclohexanmethanediol, dialkyleneglycols and polyalkylene glycols having a molecular weight of 100-4000, such as for example polyethylene glycol, polypropylene glycol and mixtures thereof. Preferably the diol component comprises at least 50% by moles of one or more diols selected from 1,2-ethanediol, 1,3-propanediol, 1,4-butanediol. More preferably the diol component comprises or consists of 1,4-butanediol.

As far as the unsaturated aliphatic diols in component b2 of polyester i. are concerned, these are preferably selected from cis 2-buten-1,4-diol, trans 2-buten-1,4-diol, 2-butyn-1,4-diol, cis 2-penten 1,5 diol, trans 2-penten 1,5 diol, 2-pentyn 1,5 diol, cis 2-hexen-1,6-diol, trans 2-hexen-1,6-diol, 2-hexyn-1,6-diol, cis 3-hexen-1,6-diol, trans 3-hexen-1,6-diol, 3-hexyn-1,6-diol. Preferably, the polyester i. comprises at least 10% by moles, more preferably at least 20% by moles, even more preferably at least 30% by moles, of aromatic dicarboxylic acids and/or aliphatic dicarboxylic acids and/or diols of renewable origin. According to the present invention, the products that can be considered of renewable origin are those obtained from sources that, by their very nature, are regenerable and inexhaustible on the time scale of human life and the use of which consequently does not negatively affect the availability of natural resources for future generations. Examples of monomers of renewable origin are sebacic acid, succinic acid, 2,5-furandicarboxylic acid, azelaic acid, 1,4-butanediol.

The Mn molecular weight of the said polyester i. is preferably ≥20000, more preferably ≥40000. As far as the polydispersity index of the molecular weights, Mw/Mn, is concerned, this is instead preferably between 1.5 and 10, more preferably between 1.6 and 5, and even more preferably between 1.8 and 2.7.

The $M_n$ and $M_w$ molecular weights may be measured using Gel Permeation Chromatography (GPC). The determination may be performed with the chromatography system held at 40° C., using a set of two columns in series (particle diameters 5 μm and 3 μm with mixed porosity), a refractive index detector, chloroform as eluent (flow 0.5 ml/min) and using polystyrene as the reference standard.

The terminal acid groups content of the said polyester i. is preferably below 100 meq/kg, preferably below 60 meq/kg, and even more preferably below 40 meq/kg.

The terminal acid groups content may be measured as follows: 1.5-3 g of polyester are placed in a 100 ml flask together with 60 ml of chloroform. After the polyester has completely dissolved 25 ml of 2-propanol are added, and then 1 ml of deionised water immediately before analysis. The solution so obtained is titrated against a previously standardised solution of NaOH in ethanol. An appropriate indicator is used to determine the end point of the titration, such as for example a glass electrode for acid-base titrations in non-aqueous solvents. The terminal acid groups content is calculated on the basis of the consumption of NaOH solution in ethanol using the following equation:

$$\text{Terminal acid groups content (meq/kg polymer)} = \frac{\lfloor (V_{eq} - V_b) \cdot T \rfloor \cdot 1000}{P}$$

in which: $V_{eq}$=ml of NaOH in ethanol at the end point of the titration of the sample;

$V_b$=ml of solution of NaOH in ethanol required to reach a pH of 9.5 in the blank titration;

T=concentration of the NaOH solution in ethanol expressed as moles/litre;

P=weight of the sample in grams.

The polyester i. has an inherent viscosity (measured using an Ubbelohde viscosimeter for solutions of concentration 0.2 g/dl in CHCl$_3$ at 25° C.) of over 0.3 dl/g, preferably between 0.3 and 2 dl/g, more preferably between 0.4 and 1.1 dl/g.

Preferably polyester i. is biodegradable. For the meaning of this invention by biodegradable polymer is meant a polymer which is biodegradable in accordance with standard EN 13432. The said polyester i. can be synthesised according to any of the processes known in the state of the art. In particular it may advantageously be obtained through a polycondensation reaction.

Advantageously the synthesis process may be performed in the presence of a suitable catalyst. By way of suitable catalysts mention may for example be made of organometallic compounds of tin, for example stannoic acid derivatives, titanium compounds, for example orthobutyl titanate, aluminium compounds, for example triisopropyl aluminium, compounds of antimony and zinc and zirconium and mixtures thereof.

As regards component ii., the composition of the film according to the present invention comprises 0.1-50% by weight, preferably 5-40%, with respect to the sum of components i.-v., of at least one polymer of natural origin. The polymer of natural origin (component ii.) is advantageously selected from starch, chitin, chitosan, alginates, proteins such as gluten, zein, casein, collagen, gelatin, natural rubbers, rosinic acid and their derivatives. Preferably, the polymer of natural origin is starch.

By the term starch is meant all types of starch, that is flour, native starch, hydrolysed starch, destructured starch, gelatinised starch, plasticised starch, thermoplastic starch, biofiller comprising complexed starch or mixtures thereof. Particularly suitable according to the invention are starches such as those from potato, maize, tapioca and peas.

Starches which are capable of easily being destructured or which have high initial molecular weights, such as for example potato or maize starch, have proved to be particularly advantageous.

The starch may be present as such or in a chemically modified form, such as for example in the form of starch esters having a degree of substitution of between 0.2 and 2.5, starch hydroxypropylate or starch modified with fatty chains.

In the case of destructured starch reference is made here to the teaching included in patents EP-0 118 240 and EP-0 327 505, meaning as such starch processed in such a way as to be substantially free from the so-called "Maltese crosses" under an optical microscope in polarised light and the so-called "ghosts" under an optical microscope with phase contrast.

Advantageously the starch is destructured by means of an extrusion process at temperatures of between 110 and 250° C., preferably 130-180° C., preferably at pressures between 0.1 and 7 MPa, preferably 0.3-6 MPa, preferably providing a specific energy of more than 0.1 kWh/kg during the said extrusion.

Destructuring of the starch preferably takes place in the presence of 1-40% by weight with respect to the weight of the starch of one or more plasticisers selected from water and polyols having from 2 to 22 carbon atoms. As far as the water is concerned, this may also be that which is naturally present in the starch. Among the polyols, those preferred are polyols having from 1 to 20 hydroxyl groups containing 2 to 6 carbon atoms, their ethers, thioethers and organic and inorganic esters. Examples of polyols are glycerine, diglycerol, polyglycerol, pentaerythritol, polyglycerol ethoxylate, ethylene glycol, polyethylene glycol, 1,2-propanediol, 1,3-propanediol, 1,4-butanediol, neopentylglycol, sorbitol monoacetate, sorbitol diacetate, sorbitol monoethoxylate, sorbitol diethoxylate, and mixtures thereof. In a preferred embodiment the starch is destructured in the presence of glycerol or a mixture of plasticisers comprising glycerol, more preferably containing between 2 and 90% by weight of glycerol. Preferably, the destructured and cross-linked starch according to this invention comprises between 1 and 40% by weight of plasticisers with respect to the weight of the starch.

The starch is preferably in the form of particles having a circular or elliptical cross section or in any event a cross-section similar to an ellipse having a mean arithmetic diameter less than 1 micron, and more preferably of less than 0.5 μm mean diameter, measured using the major axis of the particle.

As regards component iii., the composition of the film according to the present invention comprises 1-40% by weight, preferably 2-30%, with respect to the sum of components i.-v., of at least one polyhydroxyalkanoate (component iii.), preferably selected from the group consisting of polyesters of lactic acid, poly-ε-caprolactone, polyhydroxybutyrate, polyhydroxybutyrate-valerate, polyhydroxybutyrate propanoate, polyhydroxybutyrate-hexanoate, polyhydroxybutyrate-decanoate, polyhydroxybutyrate-dodecanoate, polyhydroxybutyrate-hexadecanoate, polyhydroxybutyrate-octadecanoate, poly-3-hydroxybutyrate-4-hydroxybutyrate. Preferably, the said polyhydroxyalkanoate comprises at least 80% by weight of one or more polyesters of lactic acid.

In a preferred embodiment the lactic acid polyesters are selected from the group comprising poly-L-lactic acid, poly-D-lactic acid, the poly-D-L-lactic acid stereo complex, copolymers comprising more than 50% by moles of the said lactic acid polyesters, or mixtures thereof.

Particularly preferred are lactic acid polyesters containing at least 95% by weight of repetitive units deriving from L-lactic or D-lactic acid or combinations thereof, having an Mw molecular weight of more than 50000 and a shear viscosity of between 50 and 500 Pa·s, preferably 100-300 Pa·s (measured according to standard ASTM D3835 at T=190° C., shear rate=1000 s⁻¹, D=1 mm, L/D=10).

In a particularly preferred embodiment of the invention the lactic acid polyester comprises at least 95% by weight of units deriving from L-lactic acid, ≤5% of repetitive units deriving from D-lactic acid, has a melting point within the range 135-180° C., a glass transition temperature (Tg) in the range 55-65° C. and an MFR (measured in accordance with standard ISO 1133-1 at 190° C. and 2.16 kg) within the range 1-50 g/10 min. Commercial examples of lactic acid polyesters having these properties are for example the products of the Ingeo™ Biopolymer 4043D, 3251D and 6202D make.

As regards component iv., the composition of the film according to the present invention comprises 0-15% by weight, with respect to the sum of components i.-v., of at least one inorganic filler (component iv.), which is preferably selected from kaolin, barytes, clay, talc, calcium and magnesium, iron and lead carbonates, aluminium hydroxide, diatomaceous earth, aluminium sulfate, barium sulfate, silica, mica, titanium dioxide, wollastonite.

In a preferred embodiment of this invention the inorganic filler comprises talc, calcium carbonate or their mixtures, present in the form of particles having a mean arithmetic diameter of less than 10 microns measured in relation to the major axis of the particles. It has in fact been discovered that fillers of the abovementioned type which are not characterised by the said mean arithmetic diameter prove the disintegratability characteristics significantly less during the industrial composting of objects containing them.

As regards component v., the composition of the film of the present invention comprises 0-5% by weight, preferably 0-0.5%, with respect to the sum of components i.-v., of at least one cross-linking agent and/or chain extender (component v.) in order to improve stability to hydrolysis.

The said cross-linking agent and/or chain extender is selected from compounds having two and/or multiple functional groups including isocyanate, peroxide, carbodiimide, isocyanurate, oxazoline, epoxy, anhydride or divinylether groups or mixtures thereof. Preferably the cross-linking agent and/or chain extender comprises at least one compound having two and/or multiple functional groups including isocyanate groups. More preferably the cross-linking agent and/or chain extender comprises at least 25% by weight of one or more compounds having two and/or multiple functional groups including isocyanate groups. Particularly preferred are mixtures of compounds having two and/or multiple functional groups including isocyanate groups with compounds having two and/or multiple functional groups including epoxy groups, even more preferably comprising at least 75% by weight of compounds having two and/or multiple functional groups including isocyanate groups.

The compounds having two and multifunctional groups including isocyanate groups are preferably selected from p-phenylene diisocyanate, 2,4-toluene diisocyanate, 2,6-toluene diisocyanate, 4,4-diphenylmethane-diisocyanate, 1,3-phenylene-4-chloro diisocyanate, 1,5-naphthalene diisocyanate, 4,4-diphenylene diisocyanate, 3,3'-dimethyl-4,4-diphenylmethane diisocyanate, 3-methyl-4,4'-diphenylmethane diisocyanate, diphenylester diisocyanate, 2,4-cyclohexane diisocyanate, 2,3-cyclohexane diisocyanate, 1-methyl 2,4-cyclohexyl diisocyanate, 1-methyl 2,6-cyclohexyl diisocyanate, bis-(isocyanate cyclohexyl) methane, 2,4,6-toluene triisocyanate, 2,4,4-diphenylether triisocyanate, polymethylene-polyphenyl-polyisocyanates, methylene diphenyl diisocyanate, triphenylmethane triisocyanate, 3,3'ditolylene-4,4-diisocyanate, 4,4'-methylenebis (2-methyl-phenyl isocyanate), hexamethylene diisocyanate, 1,3-cyclohexylene diisocyanate, 1,2-cyclohexylene diisocyanate and their mixtures. In a preferred embodiment the compound containing isocyanate groups is 4,4-diphenylmethane-diisocyanate.

As far as the compounds having two and/or multiple functional groups including peroxide groups are concerned, these are preferably selected from benzoyl peroxide, lauroyl peroxide, isononanoyl peroxide, di-(t-butylperoxyisopropyl) benzene, t-butyl peroxide, dicumyl peroxide, alpha,alpha-di (t-butylperoxy)diisopropylbenzene, 2,5-dimethyl-2,5-di(t-butylperoxy)hexane, t-butyl cumyl peroxide, di-t-butylperoxide, 2,5-dimethyl-2,5-di(t-butylperoxy)hex-3-yne, di(4-t-butylcyclohexyl)peroxy dicarbonate, dicetyl peroxydicarbonate, dimyristyl peroxydicarbonate, 3,6,9-triethyl-3,6,9-trimethyl-1,4,7-triperoxonane, di(2-ethylhexyl) peroxydicarbonate and mixtures thereof.

The compounds having two and/or multiple functional groups including carbodiimide groups which are preferably used in the composition according to this invention are selected from poly(cyclooctylene carbodiimide), poly(1,4- dimethylencyclohexylene carbodiimide), poly(cyclohexylene carbodiimide), poly(ethylene carbodiimide), poly(butylene carbodiimide), poly(isobutylene carbodiimide), poly(nonylene carbodiimide), poly(dodecylene carbodiimide), poly(neopentylene carbodiimide), poly(1,4-dimethylene phenylene carbodiimide), poly(2,2',6,6'-tetraisopropyldiphenylene carbodiimide) (Stabaxol® D), poly(2,4,6-triisopropyl-1,3-phenylene carbodiimide) (Stabaxol® P-100), poly(2,6 diisopropyl-1,3-phenylene carbodiimide) (Stabaxol® P), poly(tolyl carbodiimide), poly(4,4'-diphenylmethane carbodiimide), poly(3,3'-dimethyl-4,4'-biphenylene carbodiimide), poly(p-phenylene carbodiimide), poly(m-phenylene carbodiimide), poly(3,3'-dimethyl-4,4'-diphenylmethane carbodiimide), poly(naphthylene carbodiimide), poly(isophorone carbodiimide), poly(cumene carbodiimide), p-phenylene bis(ethylcarbodiimide), 1,6-hexamethylene bis(ethylcarbodiimide), 1,8-octamethylene bis(ethylcarbodiimide), 1,10-decamethylene bis(ethylcarbodiimide), 1,12 dodecamethylene bis(ethylcarbodiimide) and mixtures thereof.

Examples of compounds having two and multiple functional groups including epoxy groups which may advantageously be used in the composition according to this invention are all the polyepoxides from epoxidated oils and/or from styrene-glycidylether-methylmethacrylate or glycidylether-methylmethacrylate, included within a range of molecular weights between 1000 and 10000 and having an epoxide number per molecule within the range 1 to 30 and preferably between 5 and 25, the selected epoxides in the group comprising: diethyleneglycol diglycidylether, polyethyleneglycol diglycidyl ether, glycerol polyglycidyl ether, diglycerol polyglycidyl ether, 1,2-epoxybutane, polyglycerol polyglycidyl ether, isoprene diepoxide, and cycloaliphatic diepoxides, 1,4-cyclohaxanedimethanol diglycidyl ether, glycidyl 2-methylphenyl ether, glycerol propoxylatotriglycidyl ether, 1,4-butanediol diglycidyl ether, sorbitol polyglycidyl ether, glycerol diglycidyl ether, tetraglycidyl ethers of meta-xylenediamine and diglycidyl ether or bisphenol A and mixtures thereof.

Together with the compounds having two and multiple functional groups including isocyanate, peroxide, carbodiimide, isocyanurate, oxazoline, epoxy, anhydride and divinylether groups such as for example those described above, catalysts may also be used to raise the reactivity of the reactive groups. In the case of the polyepoxides, salts of fatty acids, even more preferably calcium and zinc stearates, may preferably be used.

In a particularly preferred embodiment of the invention the cross-linking agent and/or chain extender for the composition comprises compounds including isocyanate groups, preferably 4,4-diphenylmethane-diisocyanate, and/or containing carbodiimide groups, and/or containing epoxy groups, preferably of the styrene-glycidylether-methylmethacrylate type.

In addition to component i.-v. mentioned above, one or more other components may also advantageously be present. The film according to the present invention comprises a composition comprising the components i.-v. and preferably one or more polymers which are not the same as components i., ii. and iii., of synthetic or natural origin, which may or may not be biodegradable, together with possibly one or more other components.

As far as the polymers which are not the same as components i., ii. and iii., of synthetic or natural origin, which may or may not be biodegradable, are concerned, these are advantageously selected from the group comprising vinyl polymers, diacid diol polyesters which are not the same as polyester i., polyamides, polyurethanes, polyethers, polyureas, polycarbonates and mixtures thereof.

Among the vinyl polymers those preferred are polyethylene, polypropylene, their copolymers, polyvinyl alcohol, polyvinyl acetate, polyethylvinyl acetate and polyethylene vinyl alcohol, polystyrene, chlorinated vinyl polymers, polyacrylates.

Among the chlorinated vinyl polymers, those which are intended to be included here, in addition to polyvinyl chloride are polyvinylidene chloride, polyethylene chloride, poly(vinyl chloride-vinyl acetate), poly(vinyl chloride-ethylene), poly(vinyl chloride-propylene), poly(vinyl chloride-styrene), poly(vinyl chloride-isobutylene) and copolymers in which polyvinyl chloride represents more than 50% by moles. The said polymers may be random, block or alternating copolymers.

As far as the polyamides in the composition according to this invention are concerned, these are preferably selected from the group comprising polyamide 6 and 6,6, polyamide 9 and 9,9, polyamide 10 and 10,10, polyamide 11 and 11,11, polyamide 12 and 12,12 and their combinations of the 6/9, 6/10, 6/11 and 6/12 type, their mixtures and both random and block copolymers.

Preferably the polycarbonates of the composition according to this invention are selected from the group comprising polyalkylene carbonates, more preferably polyethylene carbonates, polypropylene carbonates, polybutylene carbonates, their mixtures and random and block copolymers.

Among the polyethers, those preferred are those selected from the group consisting of polyethylene glycols, polypropylene glycols, polybutylene glycols, their copolymers and their mixtures having molecular weights from 70000 to 500000.

As far as the diacid diol polyesters which are not the same as polyester i. are concerned, these preferably comprise:

c) a dicarboxylic component comprising, with respect to the total dicarboxylic component:
c1) 20-100% by moles of units deriving from at least one aromatic dicarboxylic acid,
c2) 0-80% by moles of units deriving from at least one saturated aliphatic dicarboxylic acid,
c3) 0-5% by moles of units deriving from at least one unsaturated aliphatic dicarboxylic acid;
d) a diol component comprising, with respect to the total diol component:
d1) 95-100% by moles of units deriving from at least one saturated aliphatic diol;
d2) 0-5% by moles of units deriving from at least one unsaturated aliphatic diol.

Preferably aromatic dicarboxylic acids c1, saturated aliphatic dicarboxylic acids c2, unsaturated aliphatic dicarboxylic acids c3, saturated aliphatic diols d1 and unsaturated aliphatic diols d2 for the said polyesters are selected from those described above for the polyester i according to this invention.

In addition to the abovementioned components the composition preferably also comprises at least one other component selected from the group consisting of plasticisers, UV stabilisers, lubricants, nucleating agents, surfactants, antistatic agents, pigments, flame-retardant agents, compatibilising agents, lignin, organic acids, antioxidants, anti-mould agents, waxes, process coadjuvants and polymer components preferably selected from the group consisting of vinyl polymers, diacid diol polyesters which are not the aliphatic-aromatic polyesters described above, polyamides, polyurethanes, polyethers, polyureas or polycarbonates.

As far as the plasticisers are concerned, in addition to the plasticisers preferably used for preparation of the destructured starch described above, one or more plasticisers selected from the group consisting of phthalates, such as for example diisononyl phthalate, trimellitates, such as for example esters of trimellitic acid with $C_4$-$C_{20}$ monoalcohols preferably selected from the group consisting of n-octanol and n-decanol, and aliphatic esters having the following structure:

$$R_1-O-C(O)-R_4-C(O)-[-O-R_2-O-C(O)-$$
$$R_5-C(O)-]_m-O-R_3$$

in which:

$R_1$ is selected from one or more groups comprising H, linear and branched saturated and unsaturated alkyl residues of the $C_1$-$C_{24}$ type, polyol residues esterified with $C_1$-$C_{24}$ monocarboxylic acids;

$R_2$ comprises —$CH_2$—$C(CH_3)_2$—$CH_2$— and $C_2$-$C_8$ alkylene groups, and comprises at least 50% by moles of the said —$CH_2$—$C(CH_3)_2$—$CH_2$— groups;

$R_3$ is selected from one or more groups comprising H, linear and branched saturated and unsaturated alkyl residues of the $C_1$-$C_{24}$ type, polyol residues esterified with $C_1$-$C_{24}$ monocarboxylic acids;

$R_4$ and $R_5$ are the same or different, comprise one or more $C_2$-$C_{22}$, preferably $C_2$-$C_{11}$, more preferably $C_4$-$C_9$ alkylenes, and comprise at least 50% by moles of $C_7$ alkylenes.

m is a number of between 1 and 20, preferably 2-10, more preferably 3-7. Preferably, in the said esters at least one of the groups $R_1$ and/or $R_3$ comprises, preferably in quantities ≥10% by moles, more preferably ≥20%, even more preferably ≥25% by moles with respect to the total quantity of $R_1$ and/or $R_3$ groups, polyol residues esterified with at least one $C_1$-$C_{24}$ monocarboxylic acid selected from the group consisting of stearic acid, palmitic acid, 9-ketostearic acid, 10-ketostearic acid and mixtures thereof. Examples of aliphatic esters of this type are described in Italian Patent Application MI2014A000030 and in PCT Applications PCT/EP2015/050336, PCT/EP2015/050338.

When present, the selected plasticisers are preferably present up to 10% by weight with respect to the total weight of the composition of the film according to the present invention.

The lubricants are preferably selected from esters and metal salts of fatty acids such as for example zinc stearate, calcium stearate, aluminium stearate and acetyl stearate. Preferably the composition of the film according to the present invention comprises up to 1% by weight of lubricants, more preferably up to 0.5% by weight with respect to the total weight of the composition of the film according to the present invention.

Examples of nucleating agents include the sodium salt of saccharine, calcium silicate, sodium benzoate, calcium titanate, boron nitride, isotactic polypropylene, or low molecular weight PLA. These additives are preferably added in quantities up to 10% by weight and more preferably between 2 and 6% by weight with respect to the total weight of the composition.

Pigments may also be added if necessary, for example titanium dioxide, clays, copper phthalocyanine, silicates, iron oxide and hydroxides, carbon black and magnesium oxide. These additives are preferably added up to 10% by weight.

The film according to this invention advantageously has a thickness of less than 40 μm, preferably less than 30 μm.

The film according to the present invention is characterized by a tear resistance in the machine direction of >100 N/mm, determined according to ASTM D1922 (at 23° C. and 55% relative humidity).

Preferably, the film according to the present invention is characterized by a tear resistance in the transversal direction of >150 N/mm, determined according to ASTM D1922 (at 23° C. and 55% relative humidity).

Preferably, the film according to the present invention is characterized by a load at break of >15 MPa, an elongation at break of >200%, an elastic modulus of >200 MPa, an energy at break of >2000 MPa, determined according to standard ASTM D882 (tensile properties at 23° C. and 55% relative humidity and Vo=50 mm/min).

Preferably, the film according to the present invention is characterized by a tear resistance in the machine direction of >100 N/mm, a tear resistance in the transversal direction of >150 N/mm (determined according to ASTM D1922 at 23° C. and 55% relative humidity), a load at break of >15 MPa, an elongation at break of >200%, an elastic modulus of >200 MPa, an energy at break of >2000 MPa (determined according to standard ASTM D882, tensile properties at 23° C. and 55% relative humidity and Vo=50 mm/min). The film according to the present invention is biodegradable in accordance with standard EN 13432. Preferably, the film according to the present invention is biodegradable in home composting according to standard UNI11355.

The film according to the present invention is particularly suitable for the production of an extensive range of articles such as for example packaging of various kinds, in particular bags for carrying of goods and bags for food packaging such as bags for fruit and vegetables.

Preferably, said bags for fruit and vegetables comprising the film of this invention are characterized by a thickness of less than 20 μm, more preferably less than 17 μm, even more preferably less than 15 μm.

The film according to the present invention can be advantageosuly be used as a single layer or in multilayer films. Said multilayer films may be produced according to any of those processes known in the art, through for example a coextrusion, coating/spreading or lamination process.

This invention will now be illustrated on the basis of a number of examples which are not intended to be limiting thereupon.

EXAMPLES i-1. Poly (1,4-butylene adipate-co-1,4-butylene azelate-co-1,4-butylene terephthalate) with 49% mol of 1,4-butylene terephthalate units and with 30% mol of azelaic acid units with respect to the sum of azelaic acid and adipic acid units. MFR 6.7/10 min (at 190° C., 2.16 kg) and 33 meq/kg amount terminal acid groups.

i-2. Poly (1,4-butylene adipate-co-1,4-butylene azelate-co-1,4-butylene terephthalate) with 48.5% mol of 1,4-butylene terephthalate units and with 20% mol of azelaic acid units with respect to the sum of azelaic acid and adipic acid units. MFR 6.6/10 min (at 190° C., 2.16 kg) and 35 meq/kg amount terminal acid groups.

i-3. Poly (1,4-butylene adipate-co-1,4-butylene azelate-co-1,4-butylene terephthalate) with 48% mol of 1,4-butylene terephthalate units and with 13% mol of azelaic acid units with respect to the sum of azelaic acid and adipic acid units. MFR 6.2/10 min (at 190° C., 2.16 kg) and 48 meq/kg amount terminal acid groups.

i-4. Poly (1,4-butylene adipate-co-1,4-butylene azelate-co-1,4-butylene terephthalate) with 48% mol of 1,4-butylene terephthalate units and with 6% mol of azelaic acid units with respect to the sum of azelaic acid and adipic acid units. MFR 5.5/10 min (at 190° C., 2.16 kg) and 49 meq/kg amount terminal acid groups.

i-5. Poly (1,4-butylene adipate-co-1,4-butylene terephthalate) with 47% mol of 1,4-butylene terephthalate units. MFR 6.9/10 min (at 190° C., 2.16 kg) and 42 meq/kg amount terminal acid groups.

iii. Ingeo 4043D polylactic acid ("PLA"). MFR 3.0/10 mm (at 190° C., 2.16 kg).

ii. Thermoplastic maize starch.

iv. Calcium carbonate Cacitec M/2 by Mineraria Sacilese.

v-1. Almatex PD4440 styrene-glycidyl ether-methyl-metacrilate copolymer from Anderson Development Company.

v-2. HMV-15CA Carbodilite from Nisshinbo Chemical Inc.

TABLE 1

| Example | Component (wt %) | | | | | | | | | | Film thickness |
| | i-1 | i-2 | i-3 | i-4 | i-5 | ii | iii | iv | v-1 | v-2 | (μm) |
|---|---|---|---|---|---|---|---|---|---|---|---|
| 1 | 61.00 | — | — | — | — | 30.35 | 8.30 | — | 0.15 | 0.20 | 20 |
| 2 (comparative) | — | — | — | — | 61.00 | 30.35 | 8.30 | — | 0.15 | 0.20 | 20 |
| 3 | 57.80 | — | — | — | — | 37.75 | 4.00 | — | 0.20 | 0.25 | 20 |
| 4 | — | 57.80 | — | — | — | 37.75 | 4.00 | — | 0.20 | 0.25 | 20 |
| 5 | — | — | 57.80 | — | — | 37.75 | 4.00 | — | 0.20 | 0.25 | 20 |
| 6 | — | — | — | 57.80 | — | 37.75 | 4.00 | — | 0.20 | 0.25 | 20 |
| 7 (comparative) | — | — | — | — | 57.80 | 37.75 | 4.00 | — | 0.20 | 0.25 | 20 |
| 8 | 54.70 | — | — | — | — | 40.85 | 4.00 | — | 0.20 | 0.25 | 20 |
| 9 (comparative) | — | — | — | — | 54.70 | 40.85 | 4.00 | — | 0.20 | 0.25 | 20 |
| 10 | 49.00 | — | — | — | — | 46.55 | 4.00 | — | 0.20 | 0.25 | 20 |
| 11 (comparative) | — | — | — | — | 49.00 | 46.55 | 4.00 | — | 0.20 | 0.25 | 20 |
| 12 | 56.00 | — | — | — | — | 30.35 | 8.30 | 5 | 0.15 | 0.20 | 20 |
| 13 | 57.80 | — | — | — | — | 37.75 | 4.00 | — | 0.20 | 0.25 | 25 |
| 14 | 57.80 | — | — | — | — | 37.75 | 4.00 | — | 0.20 | 0.25 | 14 |

The compositions indicated in Table 1 were fed to a co-rotating twin extruder (APV2030) with L/D=40 and diameter 30 mm provided with 15 heating zones. The extrusion parameters are as follows:
rpm: 250
flow rate: 9 Kg/h
thermal profile: 30-90-160-200×10-165×3° C.
degassing in L/D=30

The compositions of Table 1 were filmed on a 40 mm Ghioldi, die gap=0.9 mm, flow rate 24 kg/h and blow-up ratio=3.2 to obtain film with a thickness of 25 μm (draw-down ratio=11.4), 20 μm (draw-down ratio=14.3) and 14 μm (draw-down ratio=20.4).

The films were the subjected to mechanical characterization according to the standard ASTM D882 (traction at 23° C. and 55% relative humidity, Vo=50 mm/min) and also according to ASTM D1922 (tearing resistance at 23° C. and 55%~ relative humidity).

Results are presented in Table 2 below.

TABLE 2

| Example | ASTM D882 (23° C. 55% RH - Vo 50 mm/min) | | | | ASTM D1922 (23° C. - 55% RH ) Machine Direction |
| | $\sigma_b$ (MPa) | $\varepsilon_b$ (%) | E (MPa) | $En_b$ (kJ/m²) | Force (N/mm) |
|---|---|---|---|---|---|
| 1 | 29.0 | 241 | 307 | 2491 | 232 |
| 2 (comparative) | 31.0 | 262 | 362 | 2930 | 72 |
| 3 | 26.8 | 372 | 221 | 3706 | 191 |
| 4 | 26.5 | 340 | 231 | 3367 | 166 |
| 5 | 26.0 | 328 | 240 | 3308 | 125 |
| 6 | 25.1 | 310 | 233 | 2897 | 105 |
| 7 (comparative) | 24.3 | 278 | 212 | 2538 | 95 |
| 8 | 24.3 | 295 | 220 | 2754 | 180 |
| 9 (comparative) | 23.1 | 259 | 257 | 2318 | 91 |
| 10 | 21.9 | 228 | 296 | 2030 | 143 |
| 11 (comparative) | 20.9 | 206 | 275 | 1727 | 67 |
| 12 | 24 | 305 | 367 | 2794 | 196 |
| 13 | 24.9 | 385 | 214 | 3629 | 198 |
| 14 | 25.6 | 253 | 238 | 2538 | 132 |

The invention claimed is:

1. A film made by a composition comprising:
i) 30-95% by weight, with respect to the sum of components i.-v., of at least one polyester comprising:
  a) a dicarboxylic component containing with respect to the total dicarboxylic component:

a1) 45-60% by moles of units deriving from at least one aromatic dicarboxylic acid;
    a2) 55-40% by moles of units deriving from saturated aliphatic dicarboxylic acid comprising at least 50% by moles of a mixture of adipic acid and azelaic acid, wherein the mixture contains azelaic acid in a quantity of between 5 and 40% by moles of azelaic acid with respect to the sum of adipic acid and azelaic acid;
    a3) 0-5% by moles of units deriving from at least one unsaturated aliphatic dicarboxylic acid;
  b) a diol component comprising with respect to the total diol component:
    b1) 95-100% by moles of units deriving from at least one saturated aliphatic diol;
    b2) 0-5% by moles of units deriving from at least one unsaturated aliphatic diol;
ii) 0.1-50% by weight, with respect to the sum of components i.-v., of at least one polymer of natural origin,
iii) 1-40% by weight, with respect to the sum of components i.-v., of at least one polyhydroxy alkanoate;
iv) 0-15% by weight, with respect to the sum of components i.-v., of at least one inorganic filler;
v) 0-5% by weight, with respect to the sum of components i.-v., of at least one crosslinking agent and/or chain extender comprising at least one compound having two and/or multiple functional groups including isocyanate, peroxide, carbodiimide, isocyanurate, oxazoline, epoxide, anhydride divinylether groups and mixtures thereof, wherein said film is characterized by a tear resistance in the machine direction of >100 N/mm, determined according to ASTM D1922 (at 23° C. and 55% relative humidity).

2. The film according to claim 1, in which the aromatic dicarboxylic acids in component a1 of polyester i. is selected from aromatic dicarboxylic acids of terephthalic acid, isophthalic acid, and heterocyclic dicarboxylic aromatic compounds, their esters, salts and mixtures thereof.

3. The film according to claim 1, in which the saturated aliphatic dicarboxylic acid of component a2 of the polyester i. comprises the mixture of adipic acid and azelaic acid further comprises at least one acid selected from succinic acid, sebacic acid, brassylic acid, their C1-C24 alkyl esters and mixtures thereof.

4. The film according to claim 1, in which the aliphatic diols in component b1 of polyester i. comprises at least 50% by moles of one or more diols selected from 1,2-ethanediol, 1,3-propanediol, and 1,4-butanediol.

5. The film according to claim 1, in which the polymer of natural origin ii. is starch.

6. The film according to claim 1, biodegradable in accordance with standard EN 13432.

7. Packaging comprising the film according to claim 1.

8. Packaging according to claim 7, selected from bags for the carrying of goods and bags for food packaging.

9. Bags for the carrying of goods according to claim 8.

10. Bags for fruit and vegetables comprising the film according to claim 1.

11. The film according to claim 2, in which the saturated aliphatic dicarboxylic acid of component a2 of the polyester i. comprises the mixture of adipic acid and azelaic acid further comprises at least one acid selected from succinic acid, sebacic acid, brassylic acid, their C1-C24 alkyl esters and mixtures thereof.

12. The film according to claim 2, in which the aliphatic diols in component b1 of polyester i. comprises at least 50% by moles of one or more diols selected from 1,2-ethanediol, 1,3-propanediol, and 1,4-butanediol.

13. The film according to claim 3, in which the aliphatic diols in component b1 of polyester i. comprises at least 50% by moles of one or more diols selected from 1,2-ethanediol, 1,3-propanediol, and 1,4-butanediol.

14. The film according to claim 2, in which the polymer of natural origin ii. is starch.

15. The film according to claim 3, in which the polymer of natural origin ii. is starch.

16. The film according to claim 1, wherein the mixture comprises azelaic acid in a quantity of between 5 and 40% by moles with respect to the sum of the adipic acid and the azelaic acid.

17. The film according to claim 1, in which the polymer of natural origin of point ii is in a quantity of between 5-40% by weight, with respect to the sum of components i.-v.

18. The film according to claim 1, in which the at least one polyhydroxyalkanoate of point iii is in a quantity of 1-30% by weight, with respect to the sum of components i.-v.

* * * * *